Jan. 12, 1932.   C. S. SLICHTER   1,840,608

FLOW METER FOR WATER SOFTENERS AND THE LIKE

Filed July 15, 1927

C. S. Slichter, INVENTOR,
BY
Philip E. Siggers
ATTORNEY.

Patented Jan. 12, 1932

1,840,608

UNITED STATES PATENT OFFICE

CHARLES S. SLICHTER, OF MADISON, WISCONSIN

FLOW METER FOR WATER SOFTENERS AND THE LIKE

Application filed July 15, 1927. Serial No. 206,080.

This invention relates to flow meters and aims, among other objects, to provide a method of and improved apparatus for gauging the rate of discharge of liquids under pressure.

Figure 1:
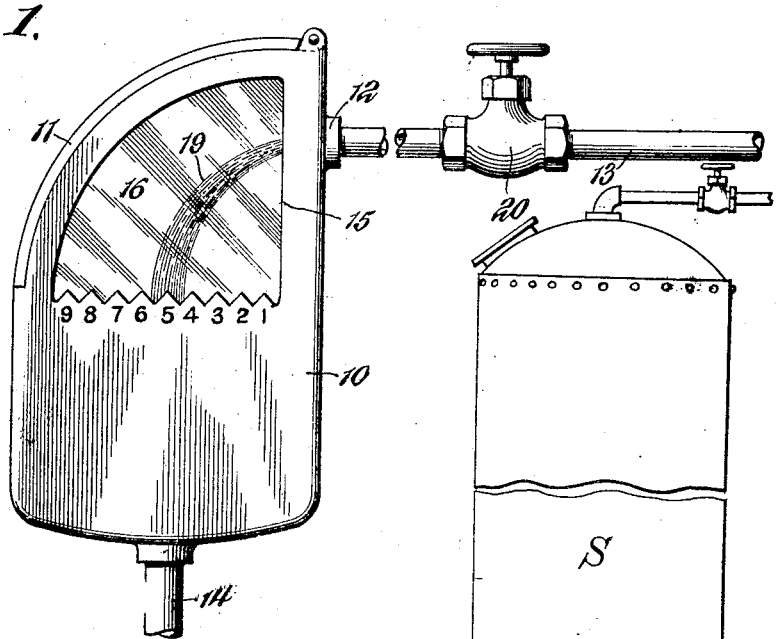
Fig. 1 is a side elevation of one embodiment of my flow meter.
Figure 2:
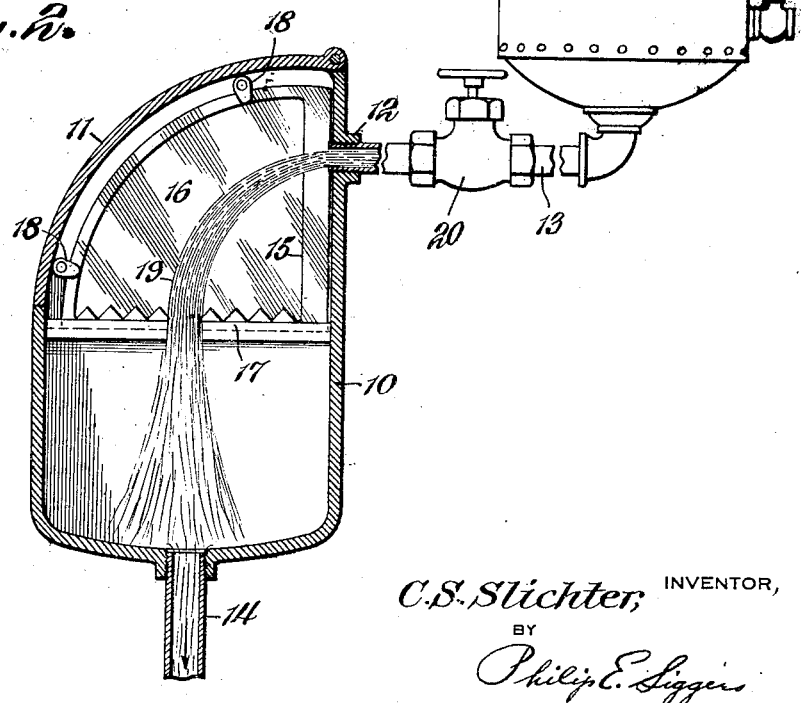
Fig. 2 is a central sectional view of the meter shown in Fig. 1 connected to the outlet pipe of a water softener shown diagrammatically on a reduced scale.

In the accompanying drawings I have shown a form of my flow meter adapted for use with water softeners. In the usual household water softener, it is necessary periodically to regenerate the "ziolite" or other softening agent by flushing it with brine, permitting it to flow at a definite rate for a definite period. The usual valve arrangement on softeners cannot be used for the purpose because the operator cannot correctly gauge the amount and the result may be that the salt is insufficiently washed out or that an excessive amount of flushing water is used. Hence, my method and apparatus are dedicated largely to the provision of simple and economical ways and means to rectify this trouble.

In the ordinary regenerative softener the softening agent (ziolite) is a chloride. When the calcium carbonates and calcium sulphates of a hard water come in contact with ziolite they are changed to the soluble calcium chloride form and the ziolite in turn is changed to a carbonate or sulphate salt. When, of course, the ziolite is completely changed over to the sulphate or carbonate form, it can no longer function as a softener and reconditioning is necessary. This reconditioning is done by passing a sodium chloride solution over the ziolite. The chlorine of the sodium chloride replaces the carbonate or the sulphate radical of the ziolite and so converts the ziolite to the chloride form. The sodium of the salt combines with the liberated carbonate or sulphate radical to form a soluble salt which is washed out with the reconditioning water.

After the conversion of the ziolite or other softening agent is complete, the additional flushing water, which of course is hard water from the city main is softened by the ziolite and therefore soft water is wasted out of the drain. In other words, any flushing water which is passed through beyond the minimum amount required to convert the ziolite and to wash out traces of the salt, reduces the capacity of the unit for softening water and renders a new reconditioning process necessary just that much sooner.

Herein, the method of measuring the flow is dependent upon computing the rate of flow from the parabolic path of a jet of liquid expelled from an orifice or pipe of a given calibration.

It is necessary to calibrate a suitable scale for the pipe and arrange it so the rate of flow, say, from the drain pipe of a softener can be readily determined by the intersection of the stream with the scale.

Herein, my meter is shown as embodied in a receptacle 10 which may be made of metal or any suitable material. It is preferably substantially rectangular in cross section and, to permit access to its interior is shown as having a lid or cover 11 hinged to the top of the rear wall. The side walls are preferably curved at their top edges and the lid is correspondingly curved.

The rear wall, adjacent to the top, is shown as having an integral screw-threaded boss 12 to receive the outlet pipe 13 for the flushing water from the softener S and, likewise, the bottom wall has provision for receiving a drain pipe 14.

One or both side walls of the receptacle has provision for permitting observation of the jet issuing from the pipe. Herein, there are shown generally triangular window openings 15 adjacent to the top of the receptacle and adapted to receive glass or other transparent windows 16 which may be suitably secured over the opening by means of retaining flanges 17 and turn buttons 18 on the inside walls of the receptacle.

To determine or gauge the flow of water from the pipe 13 upon inspection of the jet, the lower edge of the window opening is calibrated to provide a scale which corresponds to the particular size of pipe 13 to which the meter is adapted to be connected. Herein, the scale comprises a series of teeth or serrations to which numbers corresponding to any desired scale are applied. As shown in Fig. 1, the jet 19 discharging from the pipe 13 is regulated by means of a valve 20 such as is usually employed in the outlet pipes of water softeners and the rate of flow may be determined by reading on the scale the point of intersection of the projection of the jets on the scale. If the jet is discharging with great force, the point of intersection on the scale will be near the left hand end of the scale and if it is discharging with less force, it will be near the right hand end of the scale. By regulating the valve, the desired rate of flow can be obtained very quickly.

From the foregoing description it will be seen that I have provided a very simple method of gauging the flow and also a simple and durable attachment for water softeners and the like which can be manufactured very cheaply and which has provision for regulating and determining the rate of flow very quickly.

Obviously the present invention is not restricted to the particular embodiment thereof herein shown and described or to the particular steps for carrying out the method. Moreover, it is not indispensable that all the features of the invention be used conjointly since they may be employed advantageously in various combinations and subcombinations.

What is claimed is:

1. A device of the character described, comprising, in combination, an opaque receptacle; a pipe connected to discharge substantially horizontally into the receptacle adjacent to the top thereof; a drain pipe connected to the bottom thereof; said receptacle being provided with a sight opening in one wall thereof, through which the discharge from said pipe may be viewed at substantially right angles to a vertical plane through the axis of the pipe; said sight opening having a horizontal lower edge, and said edge of the opening being graduated to provide a horizontal scale whereby to determine the rate of flow from the inlet pipe.

2. A meter of the class described, comprising, in combination, a metal receptacle; a substantially horizontal pipe connected to the receptacle and discharging therein; a drain pipe connected to the receptacle; said receptacle having a sight opening at one side of the discharging jet; said sight opening having a substantially horizontal edge portion presenting a graduated scale in the form of a series of notches calibrated according to the rate of flow of the liquid whereby the intersection of a projection of the jet on the scale will indicate the rate of flow, and a valve to vary the rate of flow through the pipe.

3. A meter for determining and regulating the flow of a liquid comprising, in combination, a metal receptacle; an inlet pipe communicating with the receptacle adjacent to its upper end and arranged to discharge the liquid substantially horizontally into the receptacle so that its path is substantially parabolic; a regulating valve in the inlet pipe to regulate the rate of flow of the liquid according to requirements; said receptacle having a sight opening in one wall so that the side of the discharging jet may be observed; and a glass cover for said opening, said opening having a substantially horizontal, graduated lower edge calibrated according to the rate of flow of any jet whose projection intersects the scale.

4. In combination with the outlet pipe of a water softener, a meter comprising a casing to the upper portion of which the outlet pipe is connected; said pipe being arranged to discharge a substantially horizontal jet into the casing; a valve for regulating the flow of fluid through said pipe; and said casing presenting a sight opening and a horizontal measuring scale adjacent said sight opening and having a series of notches calibrated according to the rate of flow of the jet and so arranged that a projection of the jet intersects the scale.

In testimony that I claim the foregoing as my own, I have hereto affixed my signature.

CHARLES S. SLICHTER.